No. 872,569. PATENTED DEC. 3, 1907.
F. M. LOCKE.
SYSTEM OF INSULATION FOR HIGH VOLTAGE ELECTRIC CONDUCTORS.
APPLICATION FILED APR. 9, 1907.
2 SHEETS—SHEET 1.
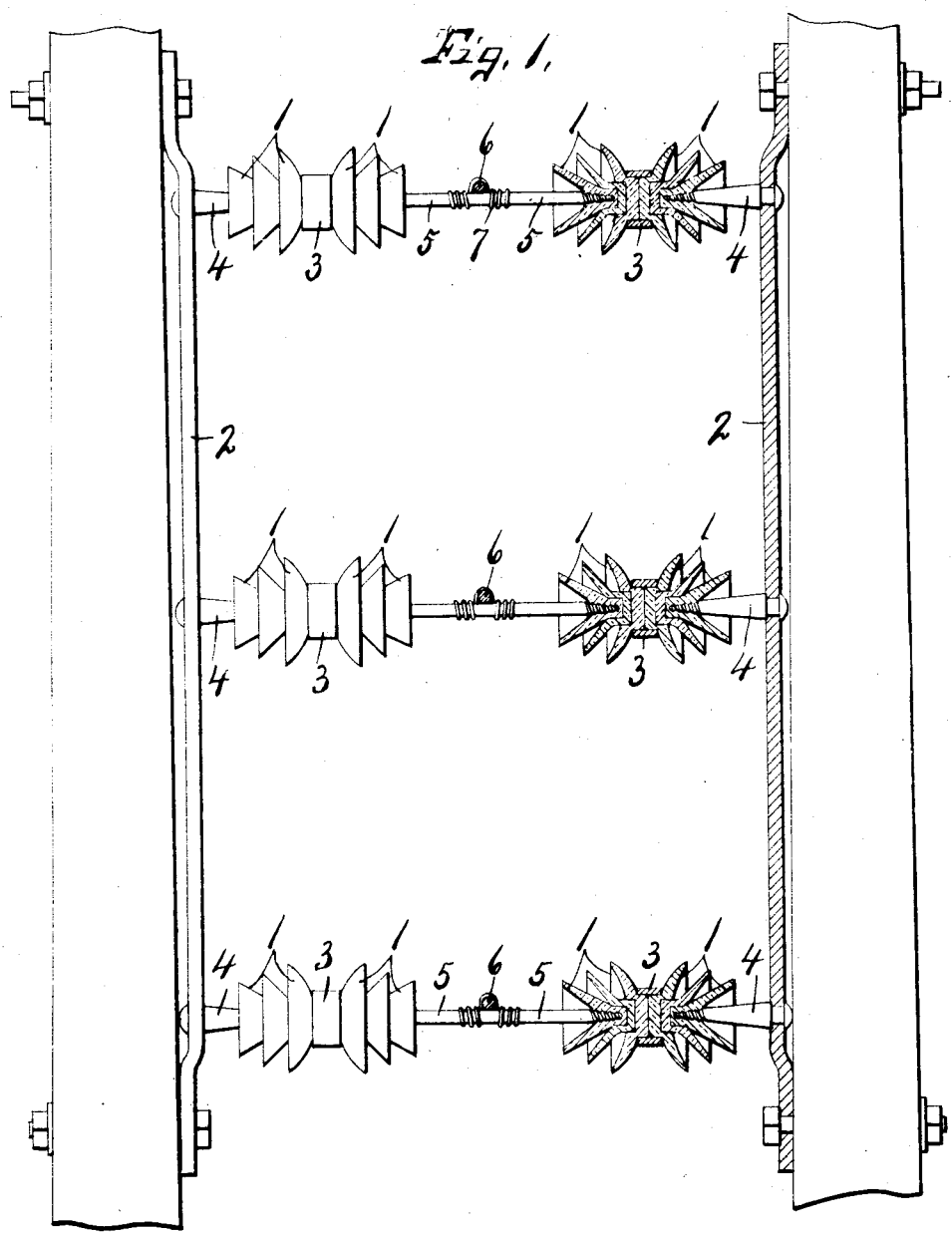

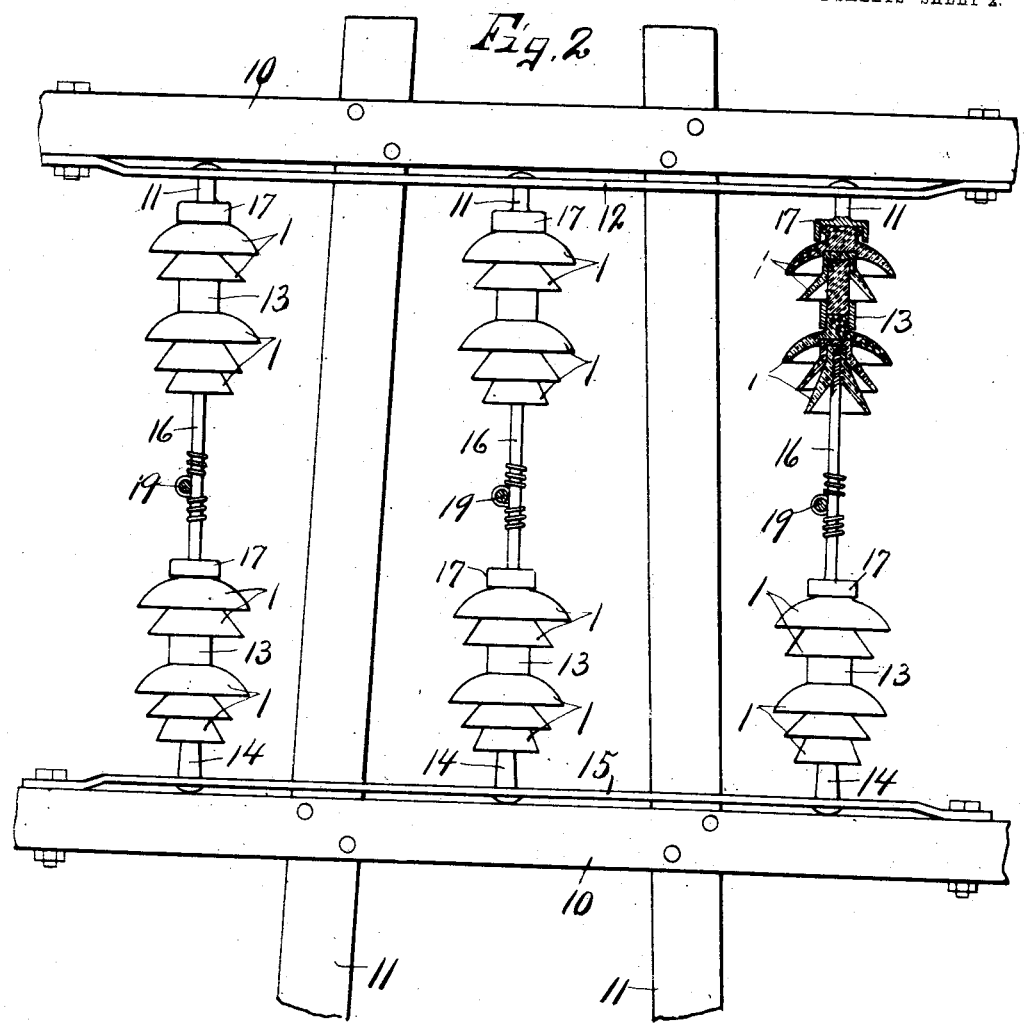

UNITED STATES PATENT OFFICE.

FRED M. LOCKE, OF VICTOR, NEW YORK.

SYSTEM OF INSULATION FOR HIGH-VOLTAGE ELECTRIC CONDUCTORS.

No. 872,569.

Specification of Letters Patent.

Patented Dec. 3, 1907.

Application filed April 9, 1907. Serial No. 367,262.

*To all whom it may concern:*

Be it known that I, FRED M. LOCKE, of Victor, in the county of Ontario, in the State of New York, have invented new and useful Improvements in Systems of Insulation for High-Voltage Electric Conductors, of which the following, taken in connection with the accompanying drawings, is a full, clear, and exact description.

This invention relates to certain improvements in system of insulation for high voltage electric conductors, and is particularly useful in connection with what is commonly known as the "three-wire" system for overhead installation upon suitable towers or poles.

As in my pending application No. 367,251 filed April 9, 1907 an indefinite number of insulators, according to the voltage of the current carried by the conductor, are interposed between said conductor and main support and are suitably tied together and to the supports to enable me to use comparatively small insulators of high electric resisting power, each insulator being composed of a plurality of sections nested together and held in fixed relation by the tie pieces.

One of the distinguishing characteristics of my present invention over those of my other pending application is that the entire system is built up with the desired number of insulators to resist arcing or static discharges of a predetermined voltage; is mounted upon a suitable supporting frame and adapted to be installed as a unit upon suitable towers or other supporting mediums.

My object, therefore, is to provide means whereby any number of insulators may be tied together in sequence in and to a suitable supporting frame constituting a system of insulation adapted to be manufactured and installed at a minimum cost, and one in which the insulators may be readily increased or diminished, according to the voltage of the current which it is desired to insulate, the general object being to conserve the current energy and preserve the supports against static discharges and arcing.

Another object is to simplify the manner of assembling the insulators and to support such insulators with their edges in vertical planes to avoid excessive accumulation of moisture from the atmosphere thereon, and thereby reduce the liability of static discharges.

Other objects and uses will appear in the following description.

In the drawings—Figure 1 is an elevation partly in section of one system of insulation for a plurality of, in this instance, three conductors. Fig. 2 is a similar elevation, partly in section of a modified system of insulators for the same purpose.

The system shown in Fig. 1 comprises a series of in this instance, three tiers of insulators —1— mounted in a suitable frame composed of side bars —2— and disposed in planes one above the other a sufficient distance apart to avoid arcing of the current from one tier to the other. Each tier comprises a series of co-axial insulators —1— arranged end to end, and preferably in pairs, those of each pair being in opposed relation with their reduced ends in juxtaposition and united by a tubular metal band —3—. Each insulator is preferably composed of a series of petticoat sections nested together, the center section of each insulator having a central socket for receiving center pins, as —4— and —5—, by which the insulators are tied to each other and to the frame bars —2—. As previously stated, the insulators of each tier are co-axial and the bases of the insulators of each pair face in opposite directions so that the central socket of the base sections at the inner side of one pair faces the central socket of the inner insulator of the other pair, and the center pins —5— are preferably made integral and enter the sockets which face each other thereby tying the inner insulators of both pairs together. The center pins —4— are secured to the pairs —2— and enter the sockets in the adjacent or outer end insulators, said pins —4— serving to carry the entire load of the insulators of both pairs together with the center pins —5— and electric conductor —6—. It is now evident that the insulator pins —4— and —5— are also co-axial, the insulator pins —4— forming direct support for the adjacent insulators —1— while the bands —3— tie the insulators of each pair together and the central pins —5— form a continuous bar or rod and serves to sustain the inner ends of the insulators of each pair and also to support the conductor —6—, which is secured to the pins —5— by means of a tie wire, as —7—, or to one of the insulators. The insulators of each tier, and their supporting mediums are identical and each center piece —5— receives and supports a conductor, as —6—, located between the opposite pairs of insulators so that each conductor is insulated from the main support or frame-bar —2— by a plurality of insulators each composed of a series of sections nested together and held in this relation by the frame bars —2— and center pins —4— and —5— with the edges of their skirts in vertical planes to prevent an accumulation of moisture thereon, and thereby avoid excessive static discharges. It is also obvious that the number of insulators between the conductor and main supporting frame —2— may be increased or diminished to correspond with the degree of voltage of the current carried by the conductor —6—, which may be mounted on the bar or an insulator.

The system of insulation shown in Fig. 2 is supported upon suitable cross arms —10— of a tower structure —11— and comprises a plurality of, in this instance, three vertical tiers of insulators —1— of the petticoat type nested or otherwise secured together, those of each tier being arranged in upper and lower sets or pairs, the upper insulator of the upper pair secured by a tie piece —11— to a lengthwise metallic bar —12— of the cross bar —10— and is united to its companion insulator by a metallic sleeve —13—. The bottom insulator of the lower pair of each tier is secured by a tie piece —14— to a second metallic bar —15— on the lower cross arm —10— and is united to its companion insulator by a metallic sleeve —13— similar to that which supports the insulators of the upper pair or set. The adjacent insulators of each tier are united by a rod or bar —16—, one end of which fits in a socket in the bottom insulator of the upper pair while the lower end is provided with a cap —17— which fits upon the upper end of the insulator of the lower pair, the upper tie piece —11— being also provided with a cap —17— which fits upon the top insulator. The insulators of each tier are held in place between the bars —12— and —15— and cross arms —10— and each constitutes a separate series of insulators for one of the conductors as —19— which may be carried upon the bar —16— or upon any one of the insulators.

All of the parts of each tier are identical and, therefore, the description given of the parts of one tier will answer for those of the other tiers.

It is evident from the foregoing description that the number of insulators and connecting mediums may be multiplied or spaced apart indefinitely to prevent arcing or static discharges from the conductor to the main supports.

What I claim is:

1. A system of insulation for high voltage currents comprising a series of co-axial insulators each composed of sections nested together, center pins entering the inner sections of said insulators and holding them in axial alinement, and supports for the end center pins.

2. A system of insulation for high voltage currents comprising a series of co-axial petticoat insulators nested together with their axes in a horizontal position, center pins entering the inner sections of said insulators, and holding them in axial alinement, and supports for the end center pins.

3. A system of insulation for high voltage electric conductors comprising a pair of insulators arranged end to end, a band encircling the adjacent ends of the insulators for holding them in axial alinement, each insulator being composed of a series of petticoat sections nested together with their open ends facing in opposite directions.

4. A system of insulation for high voltage electric conductors comprising a plurality of pairs of insulators, those of each pair being arranged end to end, metal bands encircling adjacent ends of the insulators of each pair, each insulator comprising a series of petticoat sections nested together, those of each pair having their opposite ends facing in opposite directions, and center pins entering the open ends of the center sections of each insulator.

In witness whereof I have hereunto set my hand this 30th day of March 1907.

FRED M. LOCKE.

Witnesses:
MERCIE PEER LOCKE,
C. A. MOORE.